(12) United States Patent
Tzeng

(10) Patent No.: US 7,548,052 B2
(45) Date of Patent: Jun. 16, 2009

(54) AC POWER SOURCE CONTROLLER

(75) Inventor: Jiun-Chau Tzeng, Taipei (TW)

(73) Assignees: Advanpower International Limited, Tortola (VG); Hsiu-Yu Hsu, Taipei (TW)

( * ) Notice: Subject to any disclaimer, the term of this patent is extended or adjusted under 35 U.S.C. 154(b) by 277 days.

(21) Appl. No.: 11/621,540

(22) Filed: Jan. 9, 2007

(65) Prior Publication Data

US 2007/0216459 A1    Sep. 20, 2007

(30) Foreign Application Priority Data

Mar. 20, 2006    (TW) .............................. 95204588 U

(51) Int. Cl.
*H02J 3/12* (2006.01)
(52) U.S. Cl. ...................................... 323/320
(58) Field of Classification Search ................. 323/320, 323/327; 363/81, 84, 125
See application file for complete search history.

(56) References Cited

U.S. PATENT DOCUMENTS

| | | | |
|---|---|---|---|
| 5,619,406 A * | 4/1997 | Divan et al. .................... | 363/98 |
| 6,757,185 B2 * | 6/2004 | Rojas Romero .............. | 363/89 |
| 7,397,676 B2 * | 7/2008 | Lincoln et al. ........... | 363/56.01 |
| 2004/0047166 A1 * | 3/2004 | Lopez-Santillana et al. ... | 363/89 |

* cited by examiner

*Primary Examiner*—Adolf Berhane

(57) ABSTRACT

An AC power source controller includes an input side, which is electrically connected to an output side via a power source controlling interface; and a phase modulator, which is electrically connected to the power source controlling interface. The phase modulator includes a microcontroller unit, an encoding DIP switch, a control signal receiving module, and a signal detecting interface, which may accurately detect the phase variation of an input power source so that, according to chosen conducting phase Pn, the microcontroller unit may automatically adjust the time delay Dn between conducting and cutting off orders sent to the power source control interface to control the power source output accurately, whereby the inaccuracy and instability of AC power source output control and phase difference between current and voltage generated by reactance load may be improved.

6 Claims, 7 Drawing Sheets

AC POWER SOURCE CONTROLLER

BACKGROUND OF THE INVENTION

1. Field of the Invention

The present invention generally relates to an AC power source controller, in particular, to a controller that is capable of automatic detection to generate time delay for controlling the output and the magnitude of the power source.

2. Description of Prior Art

Accordingly, at present, most magnitude varying controls of output power source are made by power source controllers that may accurately control the output according to differently required power source output. Therefore, the design and operational control of the power source controller will directly influence the controlling accuracy of its power source output. Well design and good modulating function will enhance the magnitude controlling stability of the voltage output by the power source controller.

The structure of prior power source controller applied to the output control of AC power source at least includes: an input side, an output side, and a control interface connected between input and output sides, and it may actuate power source at different phases by directly referring to the phases of input AC, thus the magnitude control of output AC power source being able to be achieved. However, the control manner of above prior configuration can not accurately detect the phase variation of input power source and the phase difference between the current and the voltage generated by the reactance load, neither have the design capability of modulating phase difference to overcome above problems, thus an accurate and stable magnitude of output AC power being unable to be achieved.

SUMMARY OF THE INVENTION

Regarding aforementioned drawbacks, the present invention is to redesign the circuit configuration of prior AC power source controller such that, according to the phase detecting signal, the power source controlling interface between the input and output sides of power source may adjust the power source output by controlling its magnitude through the microcontroller unit that generates time delay between the conducting and cutting off orders sent to the power source controlling interface according to the preset starting phase for power source output, thus its controlling stability and phase variation detecting accuracy being improved, the provision of highly efficient and practical AC power source controller to user being more convenient and cheaper.

The AC power source controller according to the present invention includes:

an input side;

an output side;

a power source controlling interface, which is electrically connected between the input and output sides for controlling the power source output; and a phase modulator, which is electrically connected to the power source controlling interface;

wherein, according to the detected phase variation of input power source and based upon a chosen conducting phase Pn, the phase modulator automatically adjusts the time delay Dn between the conducting and cutting off orders sent to the AC power source controlling interface, thus power source output being accurately controlled.

BRIEF DESCRIPTION OF DRAWING

The features of the invention believed to be novel are set forth with particularity in the appended claims. The invention itself, however, may be best understood by reference to the following detailed description of the invention, which describes several exemplary embodiments of the invention, taken in conjunction with the accompanying drawings, in which:

DETAILED DESCRIPTION OF THE INVENTION

Figure 1:
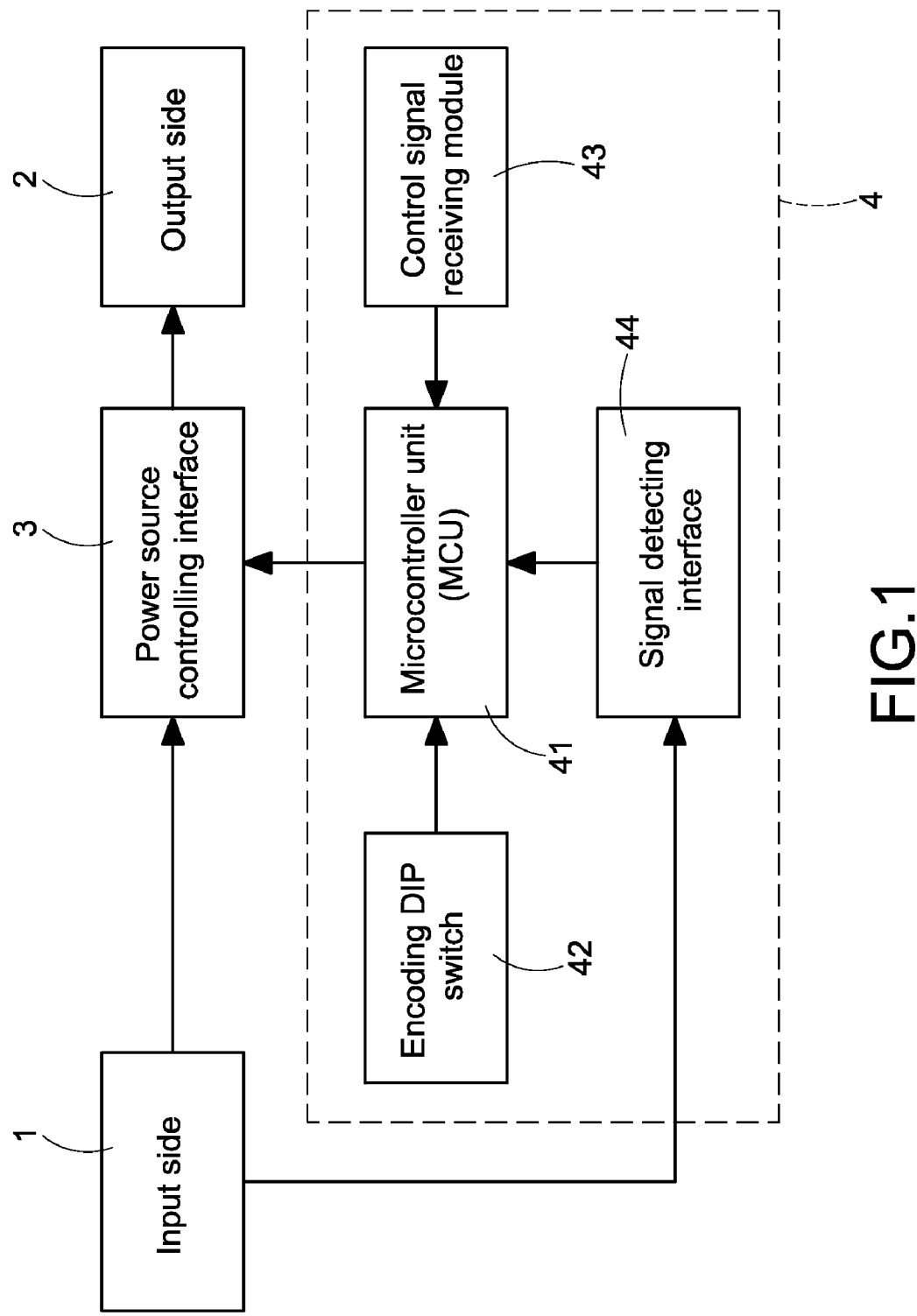
FIG. 1 is a circuit framework block diagram of one preferable embodiment according to the present invention.
Figure 2:
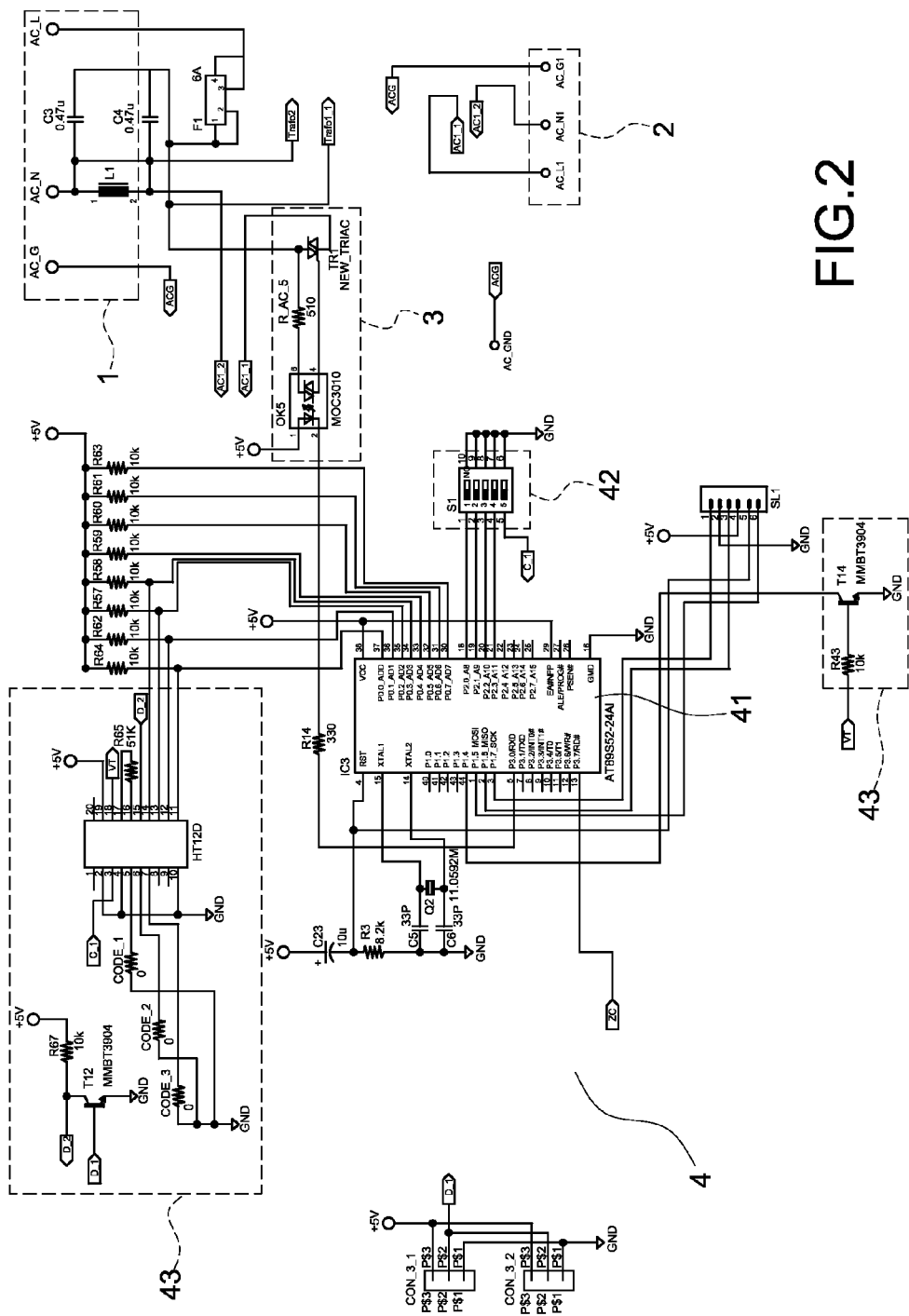
FIG. 2 is a circuit diagram of one preferable embodiment according to the present invention.
Figure 3:
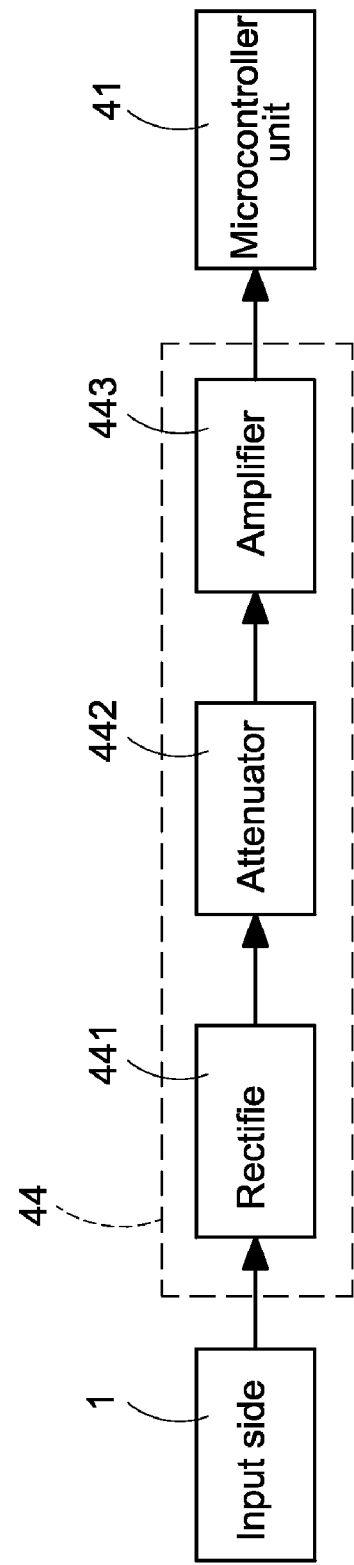
FIG. 3 is a circuit framework block diagram of the signal detecting interface according to the present invention.

In cooperation with attached drawings, the technical contents and detailed description of the present invention will be as follows.

Please refer FIG. 1 through FIG. 5, which separately are circuit comprising framework diagrams and circuit illustrations of the AC power source controller according to the present invention. As shown in these figures, the AC power source controller according to the present invention includes an input side 1, which is electrically connected to an output side 2 via a power source controlling interface 3, in addition, a phase modulator 4 being electrically connected to the input side of the power source controlling interface 3, whereby an automatic detection is constructed for generating a time delay between the conducting and cutting off orders sent to the power source controlling interface 3, thus the output magnitude of power source being stabilized and the phase difference problem between the current and voltage caused by reactance load being overcome.

The aforementioned phase modulator 4 further includes: a microcontroller unit (MCU) 41, which is electrically connected to the power source controlling interface 3 for outputting control orders; an encoding DIP switch 42, which is electrically connected to the MCU 41 for setting different system groups; a control signal receiving module 43 for receiving the control signals of different power source outputting modes; and a signal detecting interface 44, which is electrically connected to the input side 1 of power source and the input side of MCU 41 for detecting the phase of the input side 1 of power source, thereby a detecting signal being sent to the MCU 41 for calculating the parameter of time delay Dn.

In the practical embodiments of framework, the control signal receiving module 43 may be one manner of wire, wireless (RF), or infrared ray (IR) for receiving control signals.

Figure 4:
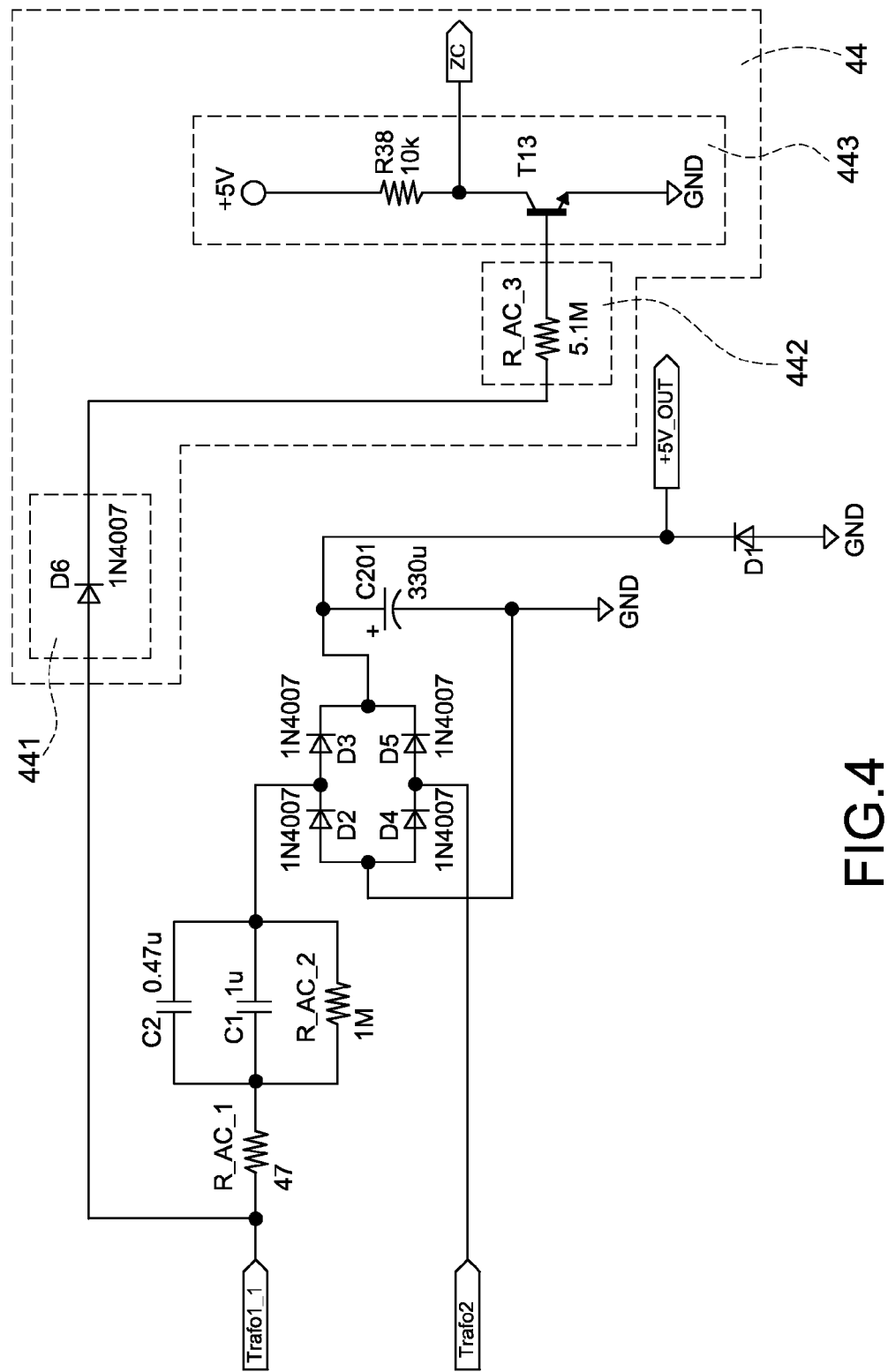
FIG. 4 is a circuit diagram of one preferable embodiment for the signal detecting interface according to the present invention.
Figure 5:
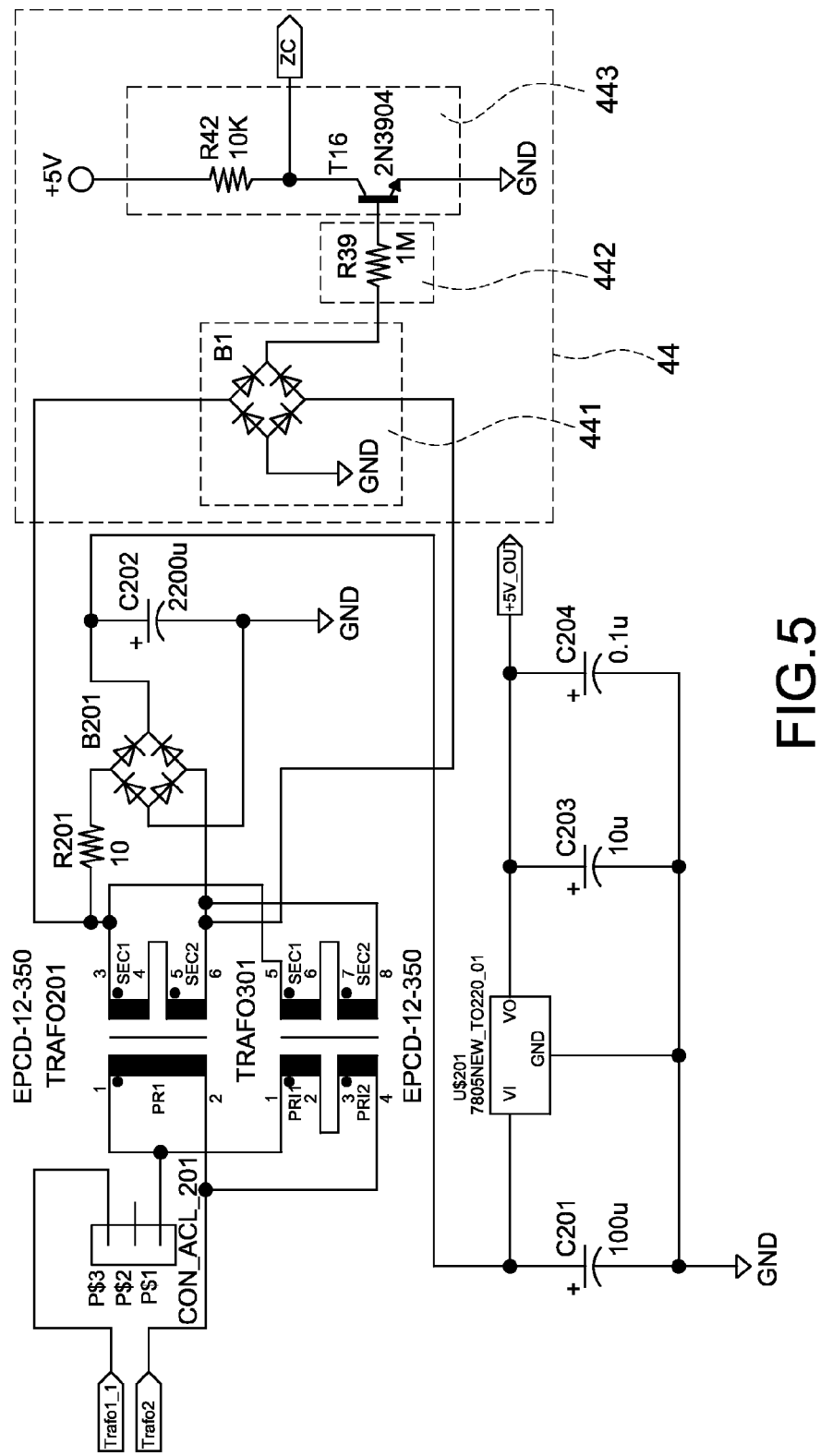
FIG. 5 is a circuit diagram of another preferable embodiment for the signal detecting interface according to the present invention.

The signal detecting interface 44 is mainly comprised of rectifier 441, attenuator 442, and amplifier 443 for accurately detecting the phase change of input power source, wherein the rectifier 441 may be a rectifying installation of one single diode, as shown in FIG. 4, or an installing application of bridge rectifier, as shown in FIG. 5.

According to resulted signal detected by the signal detecting interface 44, aforementioned MCU 41 calculates the time delay Dn. Equations (1) and (2) illustrate the relationships among time delay Dn, time delaying parameter Rn, and input period T of alternating voltage as follows:

$$Dn = Rn \div 2\pi \times T \quad (1)$$

$$Rn = Pr - Pn \quad (2)$$

Where, Pr is reference phase, and Pn is conduction phase.

According to the resulted signal detected by the signal detecting interface 44 and based upon the chosen conduction phase Pn, the microcontroller unit 41 automatically adjusts the time delay Dn between the conducting and cutting off orders sent to AC power source controlling interface 3, and thus the output magnitude of power source from output side 2 is accurately controlled.

Since the signal detecting interface 44 accurately detects the phase change of input side 1 of power source, the phase modulator 4 automatically adjust the time delay Dn between the conducting and cutting off orders sent to the AC power controlling interface 3 through the calculation of MCU 41, such that the output magnitude of power source is controlled accurately and stably, and the phase difference between the current and voltage generated by the reactance load is overcome.

Figure 6:
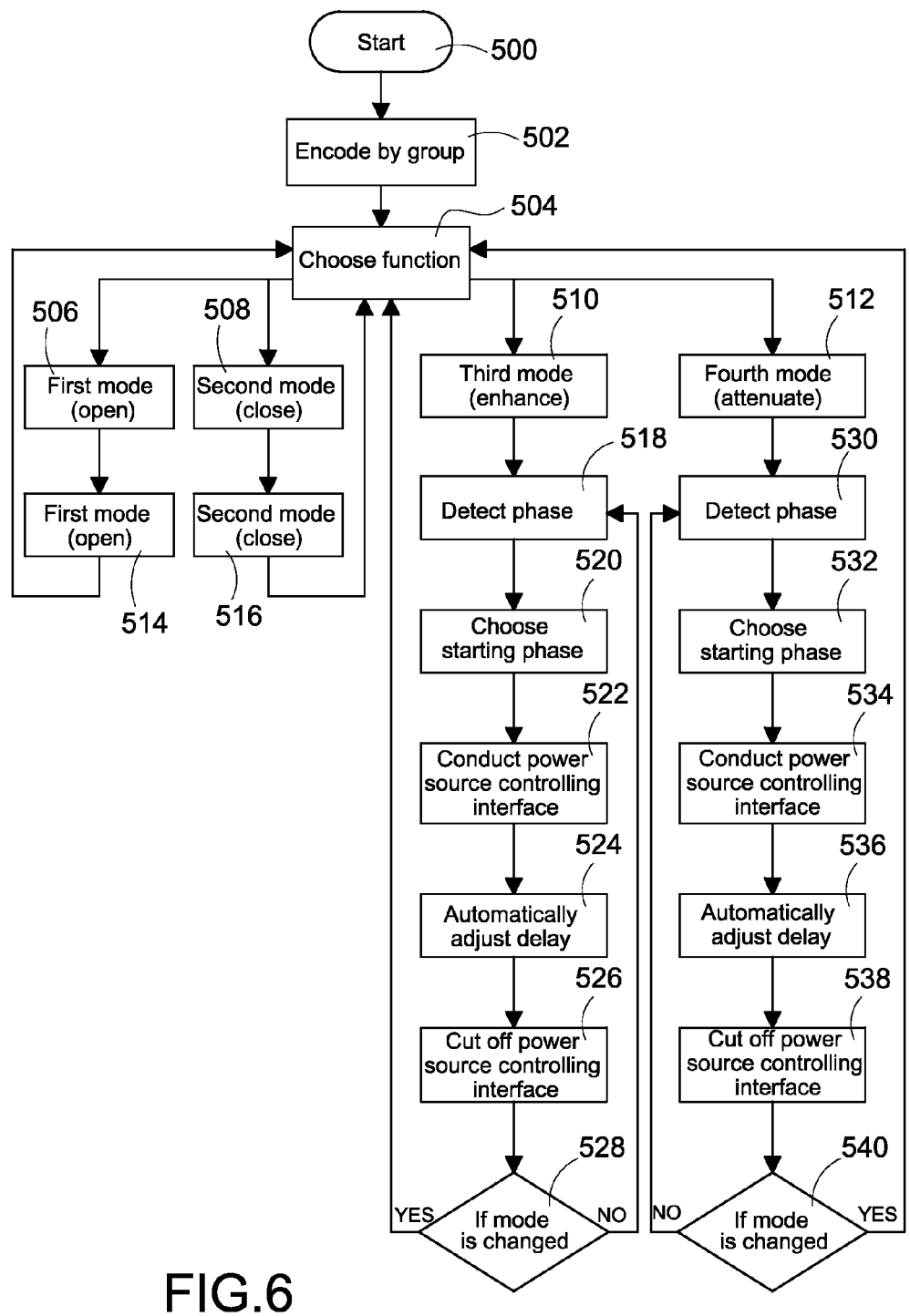
FIG. 6 is an operational flow chart illustration of one preferable embodiment according to the present invention.
Figure 7:
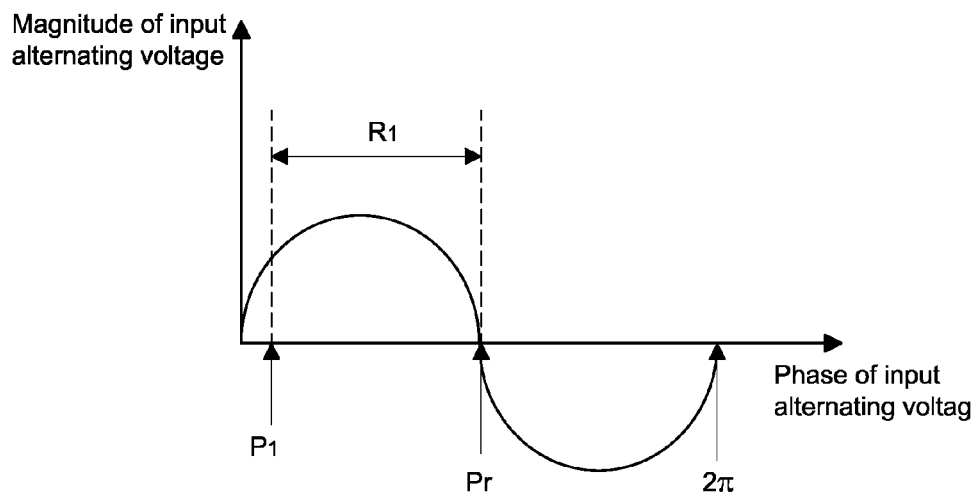
FIG. 7 and FIG. 8 are describing illustrations for the relationships among the parameters of time delay Rn, reference phase Pr, and conduction phase Pn according to the present invention.
Figure 8:
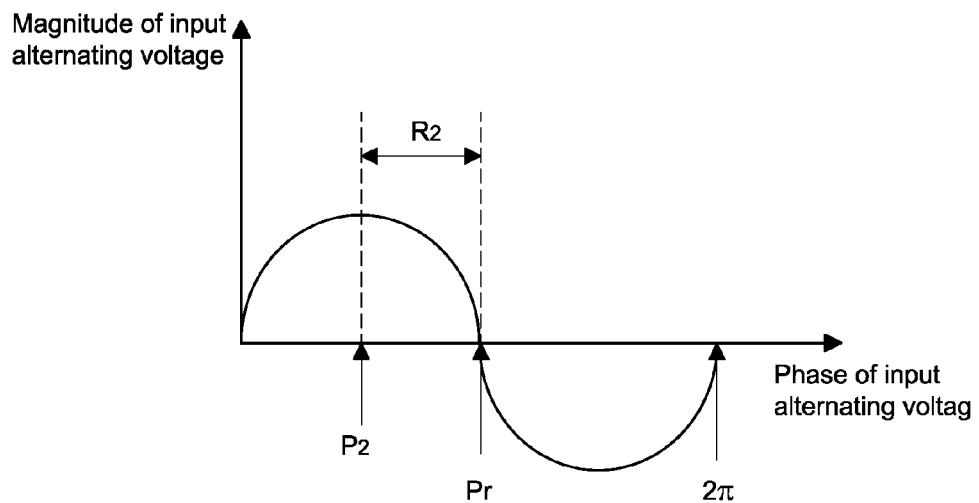

Again, please further refer to FIG. 6 through FIG. 8, which are flow chart diagram and illustrations for an operational embodiment of the AC power source controller according to the present invention. As shown in these figures, the flow chart diagram of the operational embodiment of an AC power controller comprised of the architecture according to the present invention is comprised of following steps.

Step 500: the operation is started, wherein the initial parameters are set;

Step 502: encoding by group is proceeded, wherein the set value of encoding DIP switch 42 is detected for identifying the system group;

Step 504: an intended function is chosen wherein, according to the control code transferred by the control signal receiving module 43, the intended mode for executing the output function of power source is chosen;

Step 506: the first (open) mode, where the input AC power source is output totally;

Step 508: the second (closed) mode, where the output of input AC power source is totally stopped;

Step 510: the third (enhanced) mode, where the input AC power source is output in an enhancing manner;

Step 512: the fourth (attenuated) mode, where the input AC power source is output in an attenuating manner;

Step 514: when the control signal receiving module 43 in the phase modulator 4 has received the control signal sent from step 506 (i.e., executing the function of first mode), the MCU 41 directly outputs control signal of open mode to the AC power source controlling interface 3 for conducting the input side 1 and the output side 2 to output the totally input AC power source;

Step 516: when the received control signal is from step 508 (i.e., executing the function of second mode), the MCU 41 directly outputs control signal of closed mode to the AC power source controlling interface 3 for stopping the conduction between the input side 1 and the output side 2, such that the output of the input AC power source is totally stopped;

Step 518: phase detecting procedure, where the control signal receiving module 43 in the phase modulator 4 has received the control signal sent from step 510 (i.e., executing the function of third mode) for enhancing the magnitude of input AC power source;

Step 520: procedure of choosing a conduction phase Pn wherein, according to the resulted signal detected by the signal detecting interface 44, the phase of input power source is thereby identified;

Step 522: according to the control code sent by the control signal receiving module 43, the phase of input power source is chosen as the starting point of conducting order sent to the AC power source controlling interface 3, which is then conducted;

Step 524: according to the conduction phase Pn that had been chosen in step 520, a time delay D1 is calculated by the MCU 41;

Step 526: according to the time delay D1 between the conducting and cutting off orders automatically sent to the AC power controlling interface 3 by the MCU 41, as shown in FIG. 7, a control order for cutting off the AC power source controlling interface 3 is sent out, after the power source output is completed;

Step 528: furthermore, judge if the function mode of outputting power source is changed?

If the answer is "Yes", then the execution goes to step 504 for the function choosing procedure; and if the answer is "No", then the execution goes to step 518, where the control operation is the phase detecting procedure.

When the control signal receiving module 43 in the phase modulator 4 has received a functional control signal of the fourth mode (i.e., the output magnitude of the input AC power source will be attenuated) sent from step 512, the following operation procedure constituted by steps 530~540 is same as the modulating procedure constituted by steps 518~528 following the step 510.

According to the phase change of the input side 1 of power source accurately detected by the signal detecting interface 44, the time delay Dn between the conducting and cutting off orders sent to the AC power source controlling interface 3 may be adjusted through the calculation of MCU 41, thus the output magnitude of power source being able to be controlled accurately and stably, furthermore, the phase difference between the current and voltage generated by the reactance load being able to be overcome.

Aforementioned description is only preferable embodiment according to the present invention, being not used to limit its executing scope. Any equivalent variation and modification made according to appended claims is all covered by the claims claimed by the present invention.

What is claimed is:

1. An AC power source controller, comprising:
   an input side;
   an output side;
   a power source controlling interface, which is electrically connected between said input and output sides for controlling the power source output; and
   a phase modulator, which is electrically connected to the input side of said power source controlling interface;
   further including:
      a microcontroller unit, which is electrically connected to said power source controlling interface for outputting control orders;

an encoding DIP switch, which is electrically connected to said microcontroller unit for setting different system groups;

a control signal receiving module, which is electrically connected to said microcontroller unit for receiving control signals of different power source outputting modes; and a signal detecting interface, which is electrically connected between said input side of power source and said input side of microcontroller unit for detecting phase signals input into said microcontroller unit to calculate the parameter of time delay Dn;

wherein, according to the detected phase variation of input power source and based upon a chosen conducting phase Pn, said phase modulator automatically adjusts the time delay Dn between the conducting and cutting off orders sent to the AC power source controlling interface, thus power source output being accurately controlled.

2. The AC power source controller according to claim 1, wherein said control signal receiving module receives control signals through one transmission manner of wire, wireless (RF), and infrared ray (IR).

3. The AC power source controller according to claim 1, wherein said signal detecting interface is mainly comprised of rectifier, attenuator, and amplifier.

4. The AC power source controller according to claim 3, wherein said rectifier is a diode installation.

5. The AC power source controller according to claim 3, wherein said rectifier is a bridge rectifier.

6. The AC power source controller according to claim 3 wherein, taking the detecting signals output from said signal detecting interface as parameter, said microcontroller unit calculate the time delay Dn between the conducting and cutting off orders automatically sent to said AC power source controlling interface, thus the phase difference problem between current and voltage generated by the reactance loads being able to be solved completely.

* * * * *